United States Patent [19]

Ito et al.

[11] Patent Number: 5,260,833
[45] Date of Patent: Nov. 9, 1993

[54] ZOOM LENS SYSTEM

[75] Inventors: Takayuki Ito; Nobutaka Minefuji, both of Tokyo, Japan

[73] Assignee: Asahi Kogaku Kogyo K.K., Tokyo, Japan

[21] Appl. No.: 963,743

[22] Filed: Oct. 20, 1992

[30] Foreign Application Priority Data

Oct. 22, 1991 [JP] Japan ................ 3-336409

[51] Int. Cl.$^5$ .................. G02B 15/14; G02B 13/18
[52] U.S. Cl. ......................... 359/689; 359/713
[58] Field of Search ..................... 359/689, 713

[56] References Cited

U.S. PATENT DOCUMENTS

| | | | |
|---|---|---|---|
| 4,773,744 | 9/1988 | Yamanashi | 359/689 |
| 4,822,152 | 4/1989 | Yamanashi | 359/689 |
| 4,840,467 | 6/1989 | Takada et al. | 359/689 |
| 4,854,682 | 8/1989 | Yamanashi | 359/689 |
| 4,978,204 | 12/1990 | Ito | 359/689 |
| 4,983,027 | 1/1991 | Kojima et al. | 359/689 |
| 5,148,321 | 9/1992 | Goto et al. | 359/689 |

FOREIGN PATENT DOCUMENTS

| | | |
|---|---|---|
| 63-43115 | 2/1988 | Japan . |
| 63-153511 | 6/1988 | Japan . |
| 63-155113 | 6/1988 | Japan . |
| 63-157120 | 6/1988 | Japan . |
| 63-159818 | 7/1988 | Japan . |
| 63-161423 | 7/1988 | Japan . |
| 2-73211 | 3/1990 | Japan . |

*Primary Examiner*—Scott J. Sugarman
*Attorney, Agent, or Firm*—Sughrue, Mion, Zinn, Macpeak & Seas

[57] ABSTRACT

A zoom lens system is disclosed in which a high zoom ratio of 2.5 or more, that is short in the overall lens length, that is composed of a smaller number of lens elements, that will experience less deterioration in performance due to manufacturing or assembly errors or less focus shift due to temperature or humidity changes, and which hence is suitable for use with a compact camera. The zoom lens system comprises at least three lens groups which are arranged, in order from the object side, as a first lens group having a positive focal length, a second lens group having a positive focal length and a third lens group having a negative focal length, wherein, when zooming is carried out from the wide-angle to the telephoto end, the first, second and third lens groups are moved towards the object so that the distance between the first and second lens groups is increased whereas the distance between the second and third lens groups is decreased; the third lens group comprises, in order from the object side, a lens element $3a$ having a small power and another lens element $3b$ having a large negative power the third lens group has at least one aspheric surface and satisfies the certain conditions.

5 Claims, 6 Drawing Sheets

ZOOM LENS SYSTEM

BACKGROUND OF THE INVENTION

The present application is based upon and claims priority from Japanese Patent Application No. Hei. 3-336409 filed Oct. 22, 1991, the disclosure of which is incorporated by reference herein.

The present invention relates generally to a zoom lens system that is suitable for use with compact cameras which have a smaller constraint on back focus than single-lens reflex cameras. More specifically, the present invention relates to a zoom lens system that features a high zoom ratio of 2.5 and more.

Various types of zoom lens systems have heretofore been known for use with compact cameras. Zoom lenses consisting of three lens groups or more with a zoom ratio exceeding 2 are categorized as follows:

(i) Four-group zoom lens system comprising four lens groups (positive, negative, positive and negative groups), with a stop diaphragm being provided between the second and third groups, all lens groups being moved independently of each other towards the object (this type includes a system where some of the four lens groups are moved in unison). Examples of such zoom lens systems are disclosed in Japanese Patent Laid-Open Publications No. SHO 63-43115, No. SHO 63-159818 and No. SHO 63-157120.

(ii) Three-group zoom lens system comprising three lens groups (positive, positive and negative groups), with a stop diaphragm being provided in the second group, all lens groups being moved independently of each other towards the object. Examples of this zoom lens system are disclosed in Japanese Patent Laid-Open Publications No. SHO 63-153511 and No. SHO 63-161423.

(iii) Three-group zoom lens system comprising three lens groups (positive, positive and negative groups), with a stop diaphragm being provided between the second and third groups, all lens groups being moved towards the object (see, for example, commonly assigned U.S. Pat. No. 4,978,204)

(iv) Practically four-group zoom lens system that has the same composition as the system (iii) except that the second group is divided into a front and a rear group that are movable independently of each other (see Example 3 in the specification of U.S. Pat. No. 4,978,204).

The above-described conventional zoom lens systems have their own problems. In the system (i), all of the four lens groups have to be moved independently of each other, so a large number of cams must be used; however, it is mechanistically difficult to accommodate those cams in the small space available for lenses for use with a compact camera.

The systems (i) and (ii) require that a shutter block also serving as a stop diaphragm be disposed either between the second and third lens groups (which are subject to substantial deterioration in performance due to manufacturing errors) or within the second group. Under the circumstances, it is difficult to insure high mechanical precision for the central axis of the lens groups and, at the same time, it is difficult to assure consistent optical performance since the imaging performance will be deteriorated greatly in the presence of slight errors.

In addition, the last negative lens group in the conventional three- or four-group zoom lens system has a greater power than the other lens groups. Further, it comprises, in order from the object side, a positive, a negative and a negative element or a positive, negative and a positive element, to form a three-group-three-element or a two-group-three-element composition. Thus, a large number of lens elements must be used and each lens element has a great power, causing the problem that the overall lens system will suffer from a great deterioration in performance due to manufacturing or assembly errors or from a large focus shift due to temperature or humidity changes. These phenomena of performance deterioration and focus shift are prone to become extensive as the overall lens length decreases.

Another feature of the prior art zoom lens systems is that in order to correct aberrations, an optical glass having a small Abbe number is used in the first lens element of the last lens group whereas two or more negative lens elements of a large power are provided in the rear part; however, this has increased the number of constituent lens components.

The present invention has been accomplished in the light of the aforementioned problems of the prior art and has as an object providing a zoom lens system that features a high zoom ratio of 2.5 or more, that is short in the overall lens length, that is composed of a smaller number of lens elements, that will experience less deterioration in performance due to manufacturing or assembly errors or less focus shift due to temperature or humidity changes, and which hence is suitable for use with a compact camera.

SUMMARY OF THE INVENTION

The above-stated object of the present invention can be attained by a zoom lens system that comprises at least three lens groups which are arranged, in order from the object side, as a first lens group having a positive focal length, a second lens group having a positive focal length and a third lens group having a negative focal length, wherein, when zooming is carried out from the wide-angle to the telephoto end, said first, second and third lens groups are moved towards the object so that the distance between said first and second lens groups is increased whereas the distance between said second and third lens groups is decreased, said third lens group comprising, in order from the object side, a lens element 3a having a small power and another lens element 3b having a large negative power, said third lens group having at least one aspheric surface and satisfying the following conditions (a), (b) and (c):

$$-0.2 < f3/f3a < 0.3 \quad (a)$$

$$0.7 < f3/f3b < 1.2 \quad (b)$$

$$50 < \nu 3a \quad (c)$$

where
  f3: the focal length of the third lens group;
  f3a: the focal length of the lens element 3a in the third lens group;
  f3b: the focal length of the lens element 3b in the third lens group; and
  ν3a: the Abbe number of the lens element 3a in the third lens group.

BRIEF DESCRIPTION OF THE DRAWINGS

In the accompany drawings.

DESCRIPTION OF THE PREFERRED EMBODIMENT

Figure 1:
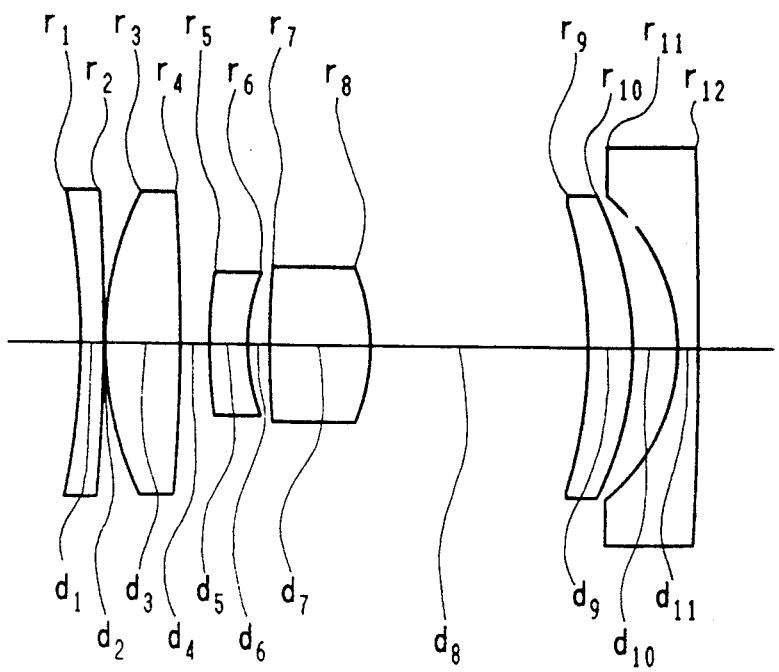
FIG. 1 is a simplified cross-sectional view of the zoom lens system according to Example 1 at the wide-angle end.

Examples of the present invention are described below.

Each of the zoom lens systems according to the examples is one of a telephoto type that comprises, in order from the object side, a first lens group having a positive focal length, a second lens group of a great power having a positive focal length, and a third lens group having a negative focal length.

The third lens group in each of the zoom lens systems has a two-element composition that comprises, in order from the object side, a lens element $3a$ having a small power and another lens element $3b$ having a small negative power; it uses at least one aspheric surface and satisfies the following conditions (a) and (b), thereby successfully reducing the number of constituent lens elements and the overall lens length:

$$-0.2 < f3/f3a < 0.3 \quad (a)$$

$$0.7 < f3/f3b < 1.2 \quad (b)$$

$$50 < \nu 3a \quad (c)$$

where $f3$: the focal length of the third lens group;

$f3a$: the focal length of the lens element $3a$ in the third lens group;

$f3b$: the focal length of the lens element $3b$ in the third lens group; and $\nu 3a$ the Abbe number of the lens element $3a$ in the third lens group.

If the upper limit of condition (a) is exceeded, the optical burden on the lens element $3a$ increases so much as to cause difficulty in achieving effective correction of astigmatism and other aberrations. If the lower limit of this condition is not reached, the power of the positive lens element that is located in the last negative lens group at the position the closest to the object will increase and the power of the negative lens group in the rear part will increase accordingly, thereby leading to greater deterioration in performance due to manufacturing or assembly errors or to a larger focus shift due to temperature or humidity changes.

Condition (b) relates to the power of the lens element $3b$. If the upper limit of this condition is exceeded, considerable difficulty is involved in correcting aberrations unless more lens elements are used. If the lower limit of condition (b) is not reached, the negative power of the lens element $3a$ will increase, causing difficulty in correcting astigmatism.

Condition (c) should be satisfied in order to perform effective correction of chromatic aberrations. If this condition is not satisfied, it is difficult to correct lateral chromatic aberration.

The lens element $3a$ has a small diameter and, in addition, its power is limited to a small value by condition (a). Hence, an aspheric surface is preferably provided in the lens element $3a$ and this is also advantageous from the manufacturing viewpoint.

Using an aspheric surface the astigmatism coefficient of which consists of a sphericity term and an asphericity term having opposite signs is preferred from the viewpoints of not only correcting aberrations but also suppressing the errors that may occur in manufacturing the aspheric surface. In other words, it is preferred to use an aspheric surface that satisfies the following condition $$-1.0 < IIISP/\Delta IIIASP < 0 \quad (d)$$

where

IIISP: the coefficient of the sphericity term in the coefficient of the third-order astigmatism due to the aspheric surface in the third lens group (the aberration coefficient is such as is calculated with the focal length of the overall system at the wide-angle end being taken as 1.0); and $\Delta IIIASP$: the amount of variation in the coefficient of astigmatism due to the aspheric surface in the third lens group.

The following is a supplemental discussion of the amount of variation in the coefficient of the third-order aberration due to an aspheric surface. The shape of an aspheric surface can generally be expressed by equation (1):

$$x = \frac{cy^2}{1 + \sqrt{1 - (1 + K)c^2 y^2}} + a4y^4 + a6y^6 + a8y^8 + a10y^{18}$$

where x is the distance by which the coordinates at the point on the aspheric surface where the height from the optical axis is y are departed from the plane tangent to the vertex of the aspheric surface; c is the curvature (1/r) of the vertex of the aspheric surface; K is the conic constant; and $a4, a6, a8$ and $a10$ are the aspheric coefficients of the fourth, sixth, eighth and tenth orders, respectively.

By calculating the focal length as f=1.0, namely, by substituting X=x/f, Y=y/f, C=fc, A4=f³α4, A6=f⁵α6, A8=f⁷α8 and A10=f⁹α10 into equation (1), the following equation (2) is obtained:

$$X = \frac{CY^2}{1+\sqrt{1-(1+K)C^2Y^2}} + A4Y^4 + A6Y^6 + A8Y^8 + A10Y^{10}$$

The second and subsequent terms of equation (2) define the amount of asphericity and the relationship between the coefficient A4 of the second term and the third-order aspheric coefficient $\phi$ is expressed by:

$$\phi = 8(N'-N)A4$$

where N is the refractive index of the medium before the aspheric surface and N' is the refractive index of the medium after the aspheric surface.

The aspheric coefficient $\phi$ provides the following amounts of variation in third-order aberration coefficients as one may call in the theory of aberrations:

$$\Delta I = h^4 \phi$$

$$\Delta II = h^3 H \phi$$

$$\Delta III = h^2 H^2 \phi$$

$$\Delta IV = h^2 H^2 \phi$$

$$\Delta V = h H^3 \phi$$

where
I: spherical aberration coefficient;
II: coma coefficient;
III: astigmatism coefficient;
IV: sagittal field curvature coefficient;
V: distortion coefficient;
h: the height of paraxial on-axis rays at which they pass through each lens surface; and
H: the height of paraxial off-axis rays passing through the center of the pupil, at which height they pass through each lens surface.

If the upper limit of condition (d) is exceeded, the sphericity and asphericity terms of the astigmatism coefficient will take on the same sign. If the lower limit of condition (d) is not reached, the astigmatism coefficient for the asphericity term becomes so smaller than that for the sphericity term as to reduce the effectiveness of adopting the aspheric surface.

If the lens element 3a in the third lens group is formed as a plastic lens that has a large Abbe number and which is small in power, the focus shift that would otherwise occur on account of temperature or humidity changes can be suppressed. This approach is also advantageous from an economic viewpoint.

If a plastic lens is to be adopted as the lens element 3a in the third lens group, a positive lens of a small power is preferably used in order to prevent the focus shift that would otherwise occur due to the change in the temperature of or humidity in the lens barrel.

Examples 1 to 3 of the zoom lens system of the present invention are described below with reference to data sheets, in which r denotes the radius of curvature of an individual lens surface (in millimeters), n the refractive index of an individual lens at the d-line, and $\nu$ the Abbe number of an individual lens at the d-line. In each data sheet, α4, α6 and α8 denote the aspheric coefficients of the fourth, sixth and eighth orders, respectively, and those surface numbers which are marked with an asterisk refer to aspheric surfaces.

EXAMPLE 1

Figure 2:
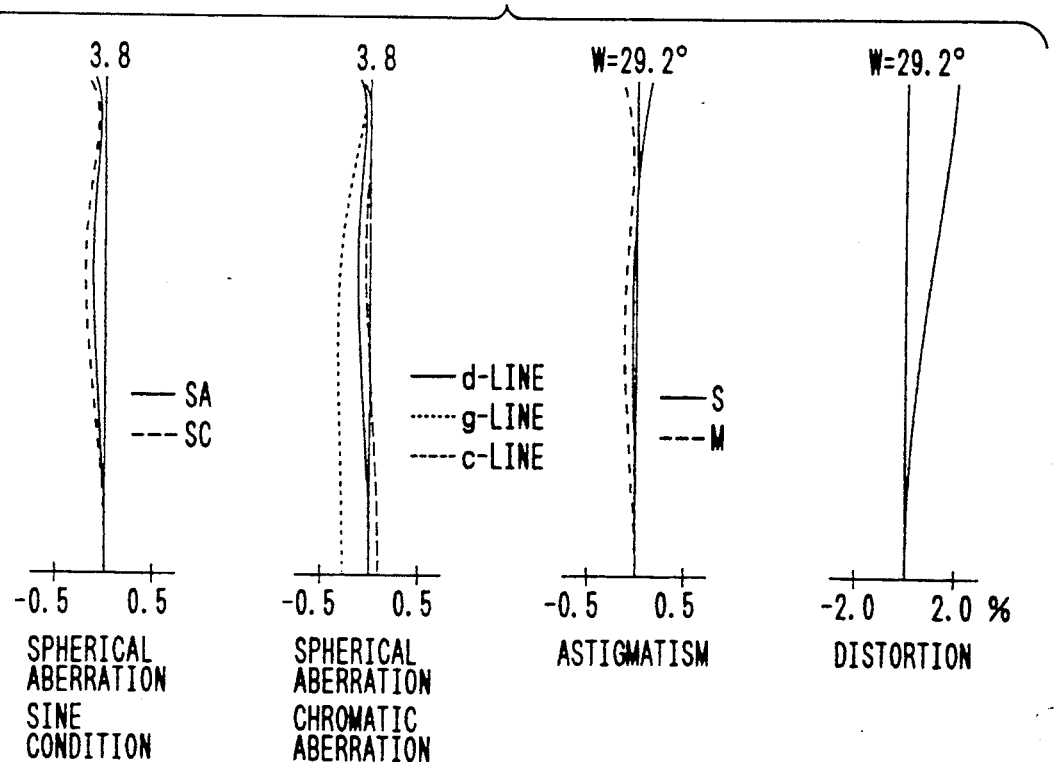
FIG. 2 is a set of graphs plotting the aberration curves obtained with the zoom lens system of Example 1.
Figure 3:
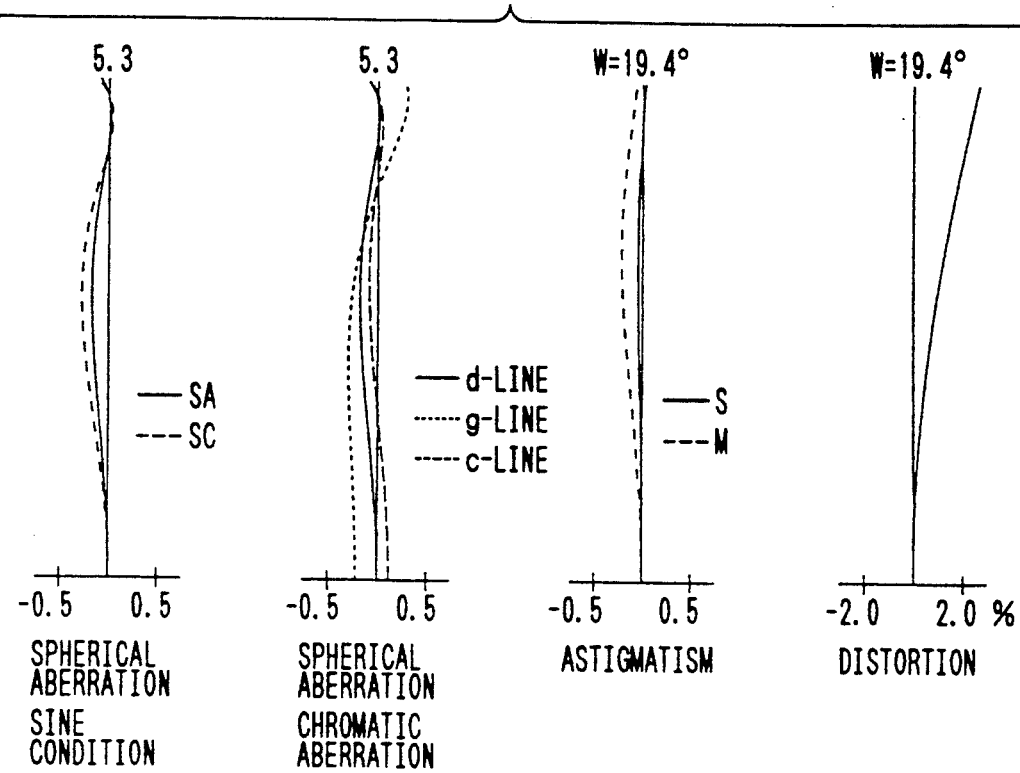
FIG. 3 is another set of graphs plotting the aberration curves obtained with the zoom lens system of Example 1.
Figure 4:
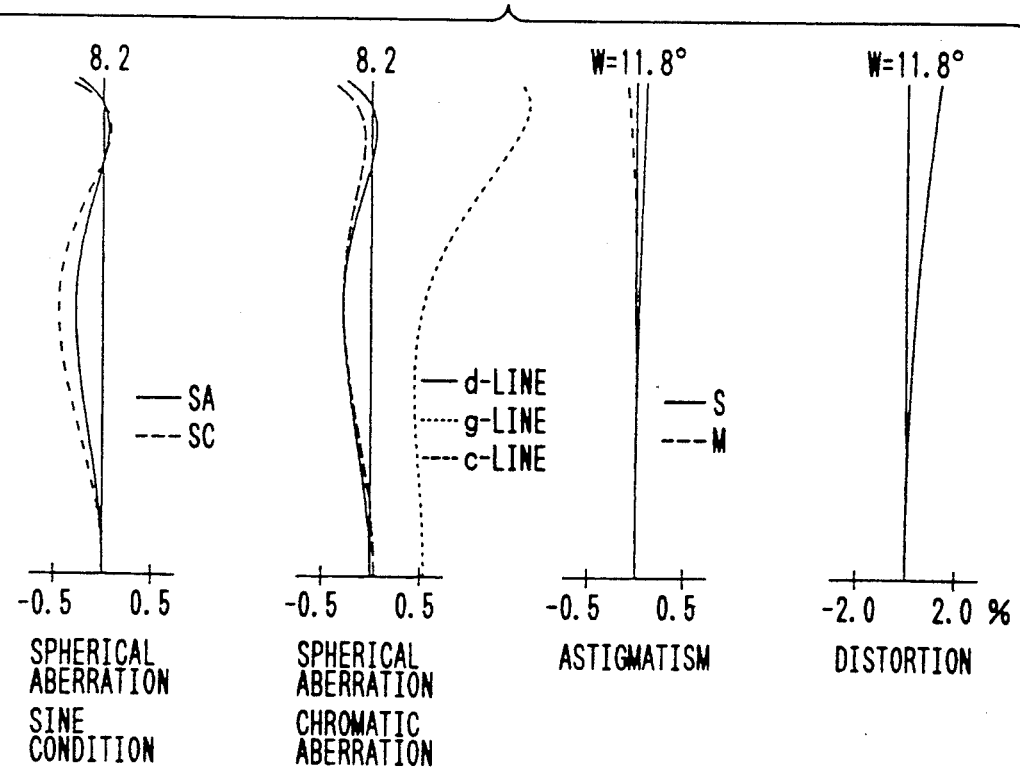
FIG. 4 is still another set of graphs plotting the aberration curves obtained with the zoom lens system of Example 1.

FIG. 1 is a simplified cross-sectional view of the zoom lens system according to Example 1 at the wide-angle end. Specific data for this example are as shown in Table 1. The aberration curves obtained with this lens system are plotted in FIGS. 2, 3 and 4.

TABLE 1

| Surface No. | r | d | n | ν |
|---|---|---|---|---|
| 1 | −46.849 | 1.50 | 1.83400 | 37.2 |
| 2 | −120.146 | 0.20 | | |
| 3 | 22.585 | 4.92 | 1.48749 | 70.2 |
| 4 | −126.251 | variable | | |
| 5* | 27.245 | 2.50 | 1.83400 | 37.2 |
| 6 | 12.806 | 1.41 | | |
| 7* | 213.136 | 6.88 | 1.62299 | 58.1 |
| 8 | −12.198 | variable | | |
| 9* | −22.397 | 3.03 | 1.48749 | 70.2 |
| 10 | −21.089 | 2.85 | | |
| 11 | −12.899 | 1.25 | 1.56907 | 71.3 |
| 12 | −468.504 | | | |

| Fifth aspheric surface | Seventh aspheric surface |
|---|---|
| K = 0 | K = 0 |
| α4 = −0.20748329 × 10⁻³ | α4 = 0.22180924 × 10⁻³ |
| α6 = −0.26813269 × 10⁻⁵ | α6 = 0.31810508 × 10⁻⁵ |
| α8 = 0 | α8 = 0 |

Ninth aspheric surface

K = 0
α4 = 0.50355359 × 10⁻⁴
α6 = 0.10192653 × 10⁻⁶
α8 = 0.53810163 × 10⁻⁹

The values of FNo., f, fB, ω, d4 and d8 vary with zooming as shown in Table 2 below.

TABLE 2

| FNo. | 3.8 | 5.4 | 8.2 |
|---|---|---|---|
| f | 37.99 | 60.00 | 102.00 |
| fB | 8.50 | 24.29 | 53.68 |
| ω | 29.2 | 19.4 | 11.8 |
| d4 | 2.00 | 8.36 | 13.60 |
| d8 | 14.60 | 8.24 | 3.00 |

EXAMPLE 2

Figure 5:
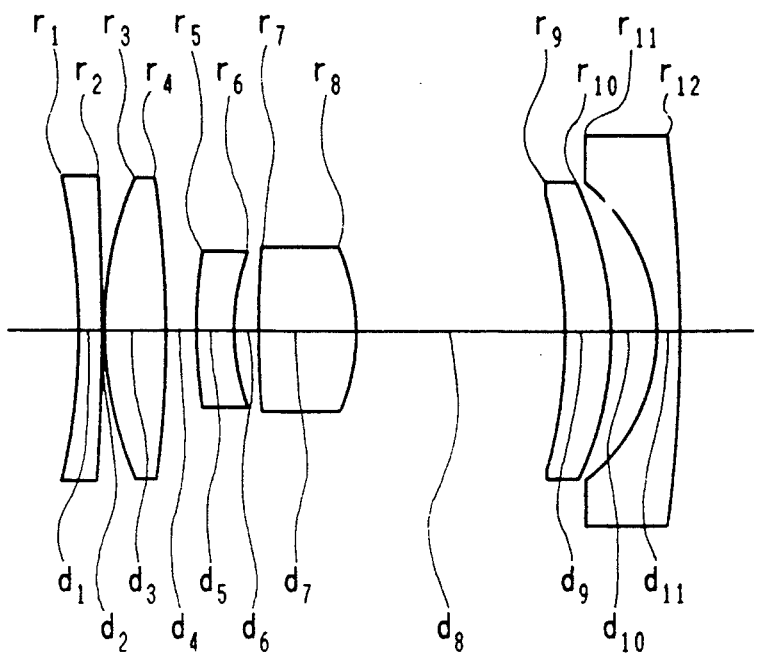
FIG. 5 is a simplified cross-sectional view of the zoom lens system according to Example 2 at the wide-angle end.
Figure 6:
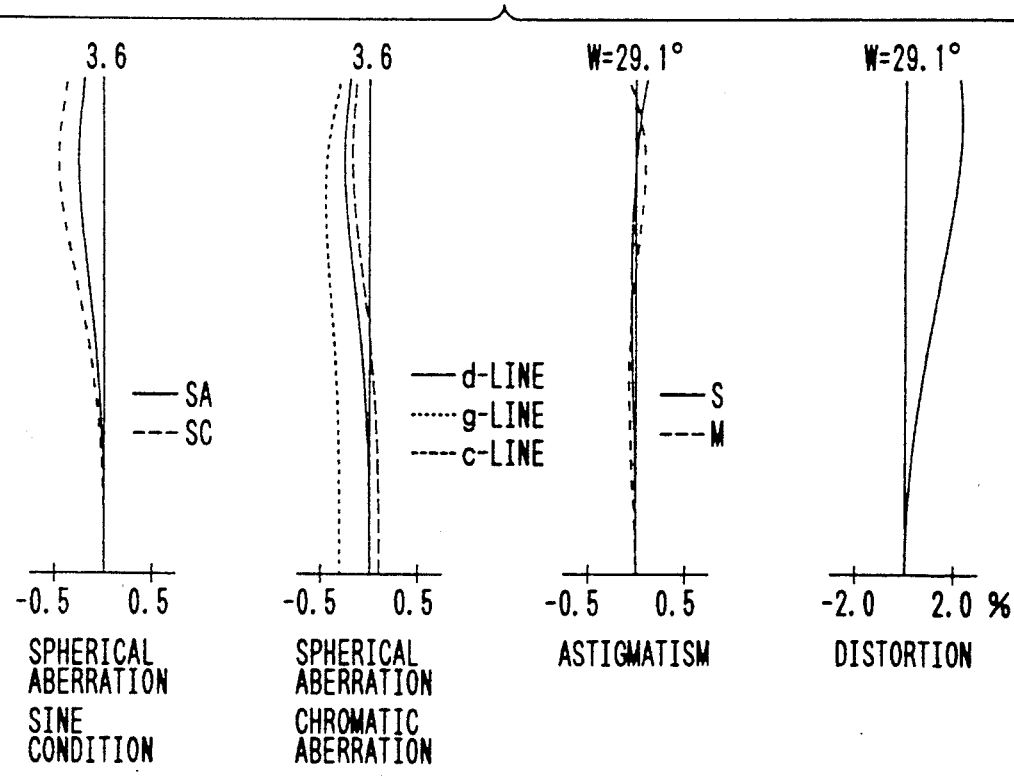
FIG. 6 is a set of graphs plotting the aberration curves obtained with the zoom lens system of Example 2.
Figure 7:
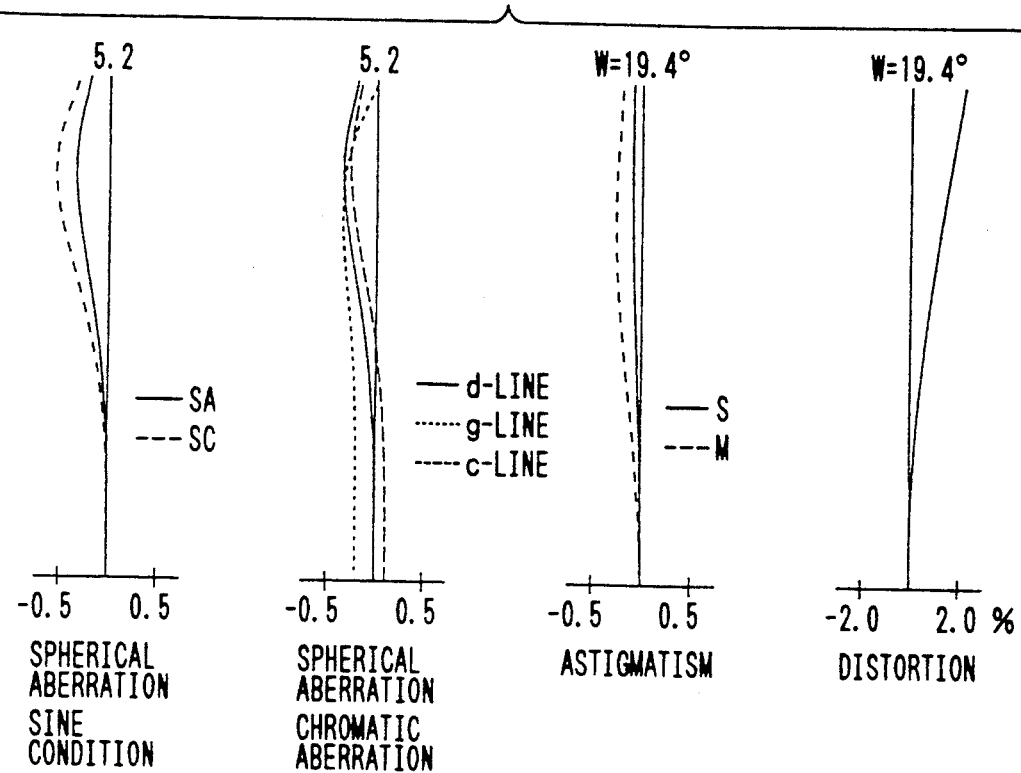
FIG. 7 is another set of graphs plotting the aberration curves obtained with the zoom lens system of Example 2.
Figure 8:
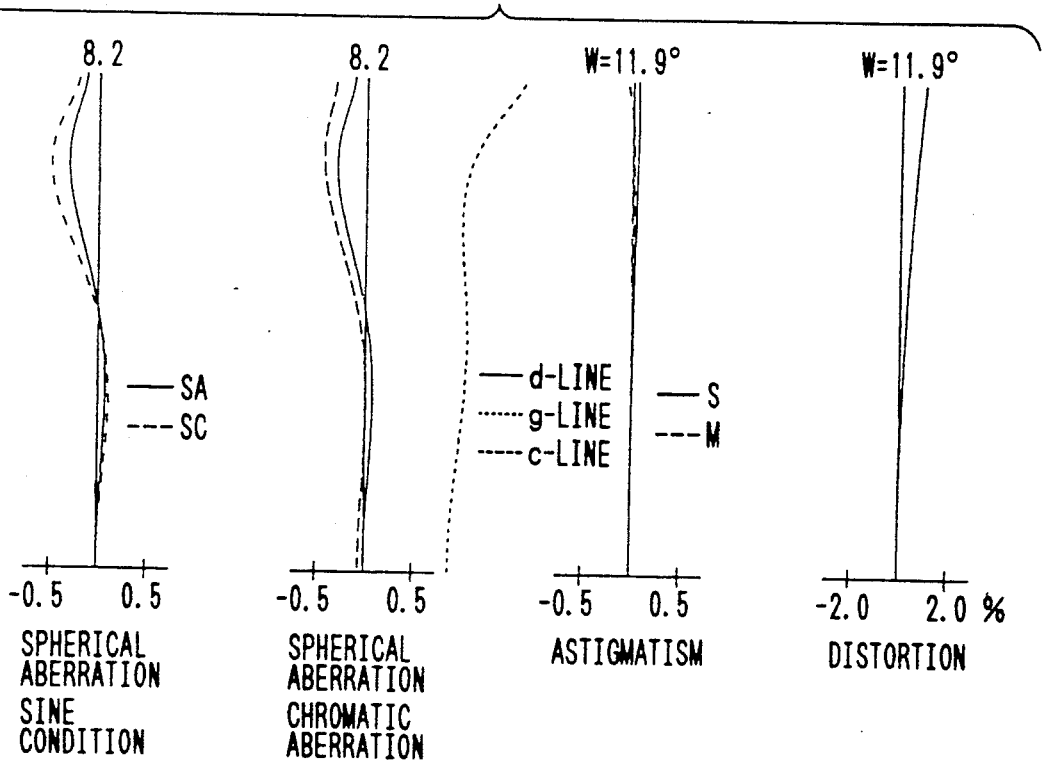
FIG. 8 is still another set of graphs plotting the aberration curves obtained with the zoom lens system of Example 2.

FIG. 5 is a simplified cross-sectional view of the zoom lens system according to Example 2 at the wide-angle end. Specific data for this example are as shown in Table 3. The aberration curves obtained with this lens system are plotted in FIGS. 6, 7 and 8.

TABLE 3

| Surface No. | r | d | n | ν |
|---|---|---|---|---|
| 1 | −40.624 | 1.50 | 1.83400 | 37.2 |
| 2 | −131.101 | 0.20 | | |
| 3 | 24.074 | 4.12 | 1.48749 | 70.2 |
| 4 | −74.799 | variable | | |
| 5* | 24.844 | 2.50 | 1.73077 | 40.5 |
| 6 | 13.447 | 1.64 | | |
| 7* | 661.131 | 6.68 | 1.58913 | 61.2 |
| 8 | −12.410 | variable | | |
| 9* | −23.000 | 3.16 | 1.49176 | 57.4 |
| 10 | −20.448 | 3.03 | | |
| 11 | −12.060 | 1.40 | 1.64000 | 60.1 |
| 12 | −101.186 | | | |

| Fifth aspheric surface | Seventh aspheric surface |
|---|---|

TABLE 3-continued

| K = 0 | K = 0 |
|---|---|
| $\alpha_4 = -0.17966510 \times 10^{-3}$ | $\alpha_4 = 0.15361650 \times 10^{-3}$ |
| $\alpha_6 = -0.19844449 \times 10^{-5}$ | $\alpha_6 = 0.26760264 \times 10^{-5}$ |
| $\alpha_8 = -0.12125023 \times 10^{-7}$ | $\alpha_8 = 0$ |

Ninth aspheric surface

K = 0
$\alpha_4 = 0.78007555 \times 10^{-4}$
$\alpha_6 = 0.17348425 \times 10^{-6}$
$\alpha_8 = 0.15729598 \times 10^{-8}$ The values of Fno., f, fB, ω, d4 and d8 vary with zooming as shown in Table 4 below.

TABLE 4

| FNo. | 3.6 | 5.2 | 8.2 |
|---|---|---|---|
| f | 38.00 | 60.00 | 102.00 |
| fB | 8.59 | 24.58 | 54.67 |
| ω | 29.1 | 19.4 | 11.9 |
| d4 | 2.00 | 7.78 | 12.39 |
| d8 | 13.89 | 8.11 | 3.50 |

EXAMPLE 3

Figure 9:
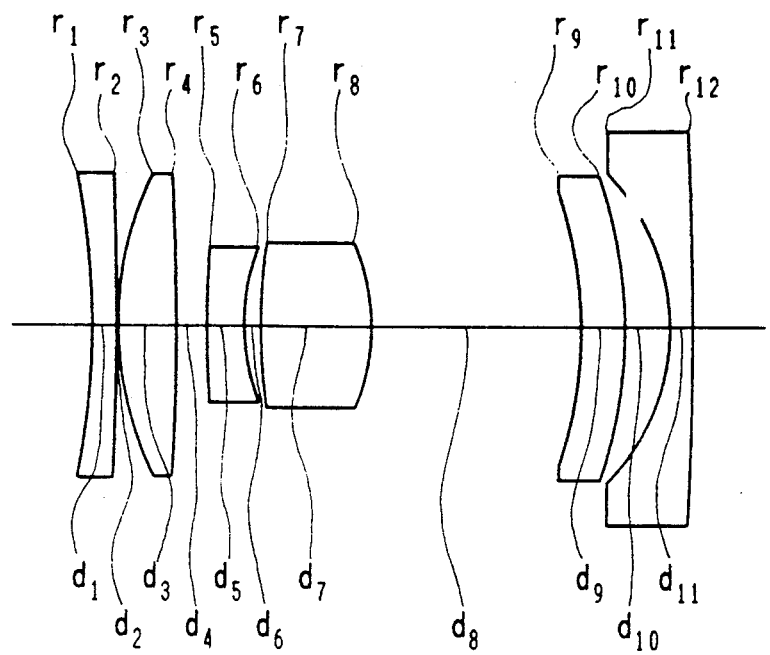
FIG. 9 is a simplified cross-sectional view of the zoom lens system according to Example 3 at the wide-angle end.
Figure 10:
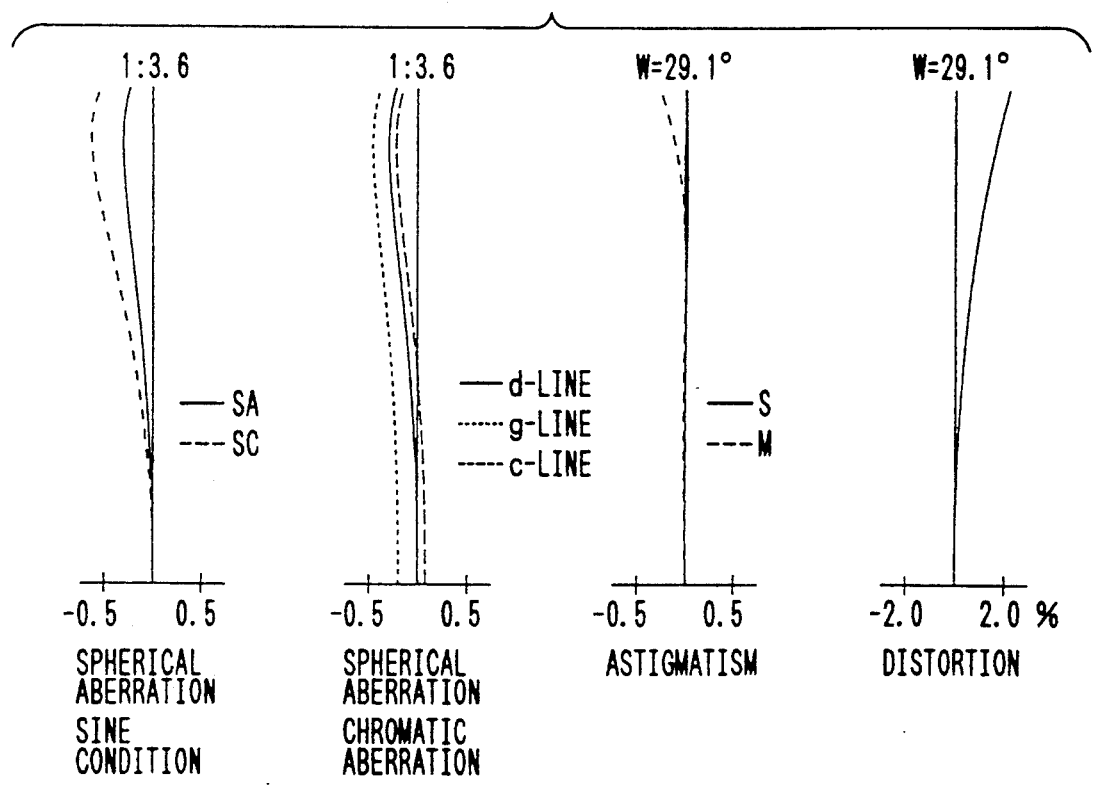
FIG. 10 is a set of graphs plotting the aberration curves obtained with the zoom lens system of Example 3.
Figure 11:
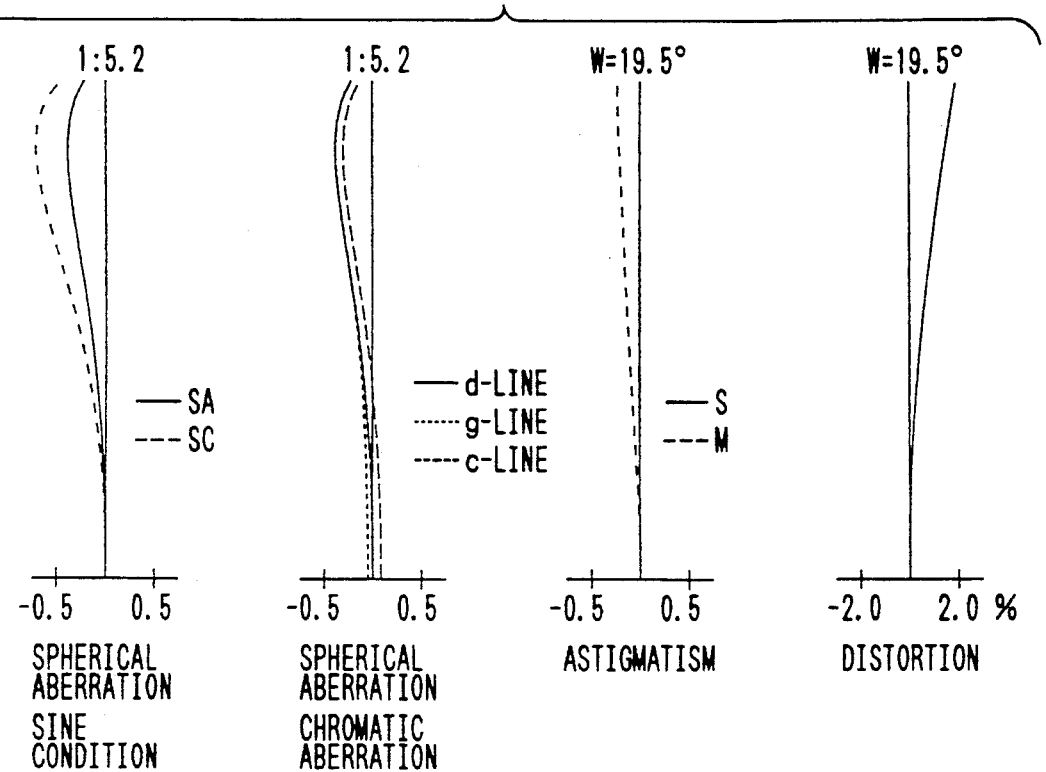
FIG. 11 is another set of graphs plotting the aberration curves obtained with the zoom lens system of Example 3.
Figure 12:
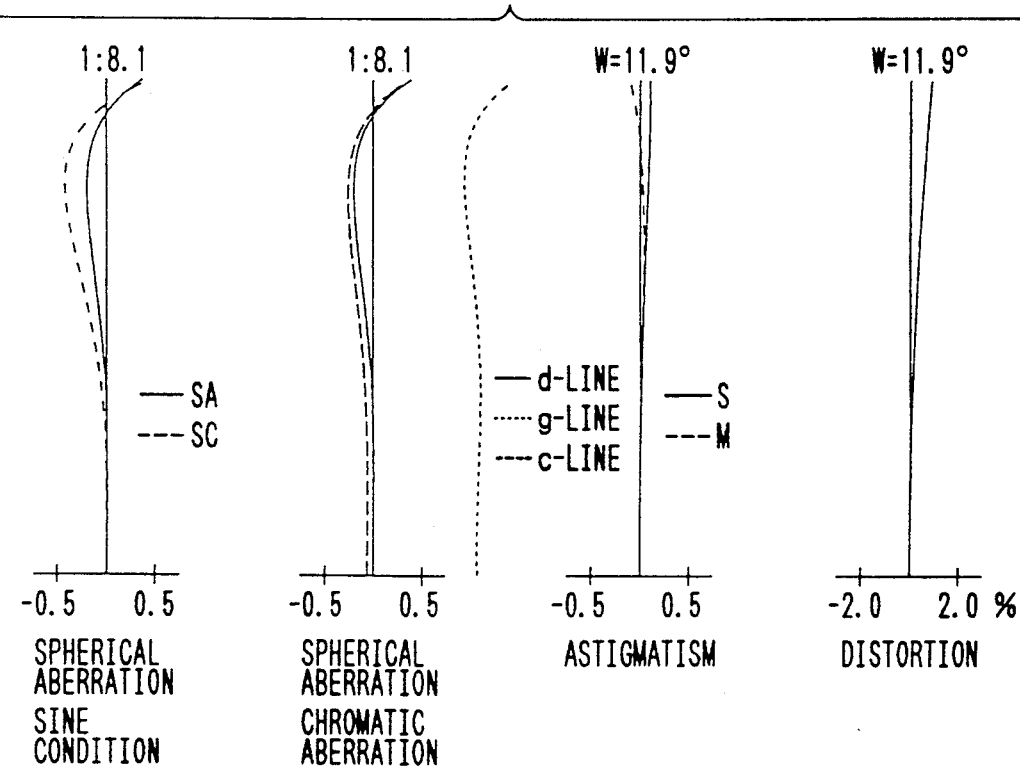
FIG. 12 is still another set of graphs plotting the aberration curves obtained with the zoom lens system of Example 3.

FIG. 9 is a simplified cross-sectional view of the zoom lens system according to Example 3 at the wide-angle end. Specific data for this example are as shown in Table 5. The aberration curves obtained with this lens system are plotted in FIGS. 10, 11 and 12.

TABLE 5

| Surface No. | r | d | n | ν |
|---|---|---|---|---|
| 1 | −47.431 | 1.50 | 1.83400 | 37.2 |
| 2 | −656.466 | 0.20 | | |
| 3 | 22.259 | 3.92 | 1.58913 | 61.2 |
| 4 | −193.075 | variable | | |
| 5* | 31.683 | 2.50 | 1.73077 | 40.5 |
| 6* | 12.063 | 1.00 | | |
| 7 | 36.333 | 7.50 | 1.58913 | 61.2 |
| 8 | −13.056 | variable | | |
| 9* | −23.000 | 2.97 | 1.48749 | 70.2 |
| 10 | −30.680 | 2.94 | | |
| 11 | −14.596 | 1.40 | 1.56907 | 71.3 |
| 12 | −329.137 | | | |

| Fifth aspheric surface | Sixth aspheric surface |
|---|---|
| K = 0 | K = 0 |
| $\alpha_4 = -0.42114860 \times 10^{-3}$ | $\alpha_4 = -0.45457599 \times 10^{-3}$ |
| $\alpha_6 = 0.90193505 \times 10^{-6}$ | $\alpha_6 = 0.22145289 \times 10^{-5}$ |
| $\alpha_8 = 0$ | $\alpha_8 = 0$ |

Ninth aspheric surface

K = 0
$\alpha_4 = 0.38145979 \times 10^{-4}$
$\alpha_6 = -0.20084770 \times 10^{-7}$
$\alpha_8 = 0.27896596 \times 10^{-9}$ The values of Fno., f, fB, ω, d4 and d8 vary with zooming as shown in Table 6 below.

TABLE 6

| FNo. | 3.6 | 5.2 | 8.1 |
|---|---|---|---|
| f | 38.00 | 60.00 | 102.00 |
| fB | 8.50 | 24.62 | 54.90 |
| ω | 29.1 | 19.5 | 11.9 |
| d4 | 2.00 | 7.81 | 12.47 |
| d8 | 13.97 | 8.16 | 3.50 |

Table 7 sows values that satisfy the conditions (a) to (d) in Examples 1 to 3.

TABLE 7

| Condition | f3/f3a | f3/f3b | ν3a | IIISP/ΔIIIASP |
|---|---|---|---|---|
| Ex. 1 | −0.056 | 1.02 | 70.2 | −0.22 |
| Ex. 2 | −0.085 | 1.05 | 57.4 | −0.26 |
| Ex. 3 | 0.11 | 0.85 | 70.2 | −0.36 |

As described on the foregoing pages, the zoom lens system of the present invention adopts an arrangement as simple as a three-group composition and, yet, by introducing special features in the arrangement of lens elements in the third lens group and their shape, it achieves a high zoom ratio of 2.5 and more while reducing the overall lens length and using a smaller number of constituent lens elements. Further, it effectively suppresses the deterioration in performance due to manufacturing or assembly errors or the focus shift due to temperature or humidity changes. Consequently, the present invention offers a zoom lens system of a telephoto type that is suitable for use with a compact camera.

What is claimed is:

1. A zoom lens system comprising at least three lens groups which are arranged, in order from the object side, as a first lens group having a positive focal length, a second lens group having a positive focal length and a third lens group having a negative focal length, wherein, when zooming is carried out from the wide-angle to the telephoto end, said first, second and third lens groups are moved towards the object so that the distance between said first and second lens groups is increased whereas the distance between said second and third lens groups is decreased, said third lens group comprising, in order from the object side, a lens element 3a having a small power and another lens element 3b having a large negative power, said third lens group having at least one aspheric surface and satisfying the following conditions (a), (b) and (c):

$$-0.2 < f3/f3a < 0.3 \quad (a)$$

$$0.7 < f3/f3b < 1.2 \quad (b)$$

$$50 < \nu 3a \quad (c)$$

where
f3: the focal length of the third lens group;
f3a: the focal length of the lens element 3a in the third lens group;
f3b: the focal length of the lens element 3b in the third lens group; and
ν3a: the Abbe number of the lens element 3a in the third lens group.

2. A zoom lens system according to claim 1 wherein the lens element 3a in said third lens group has an aspheric surface.

3. A zoom lens system according to claim 1 wherein said aspheric surface satisfy the following condition (d):

$$-1.0 < IIISP/\Delta IIIASP < 0 \quad (d)$$

where
IIISP: the coefficient of the sphericity term in the coefficient of the third-order astigmatism due to the aspheric surface in the third lens group (the aberration coefficient is such as is calculated with the focal length of the overall system at the wide-angle end being taken as 1.0); and
ΔIIIASP: the amount of variation in the coefficient of astigmatism due to the aspheric surface in the third lens group.

4. A zoom lens system according to claim 1 wherein the lens element 3a in said third lens group is formed of a plastic material and has at least one aspheric surface.

5. A zoom lens system according to claim 4 wherein the lens element 3a in said third lens group is a positive lens of small power

* * * * *